(12) United States Patent
Tong

(10) Patent No.: US 11,646,642 B2
(45) Date of Patent: May 9, 2023

(54) POWER-ON SELF-TEST METHOD FOR AN ELECTRIC POWER TOOL AND AN ELECTRIC POWER TOOL

(71) Applicant: Nanjing Chervon Industry Co., Ltd., Nanjing (CN)

(72) Inventor: Wenkang Tong, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 213 days.

(21) Appl. No.: 17/141,582

(22) Filed: Jan. 5, 2021

(65) Prior Publication Data
US 2021/0226514 A1 Jul. 22, 2021

(30) Foreign Application Priority Data
Jan. 19, 2020 (CN) .......................... 202010062856.7

(51) Int. Cl.
*H02K 7/14* (2006.01)
*H02K 11/33* (2016.01)
*H02P 6/08* (2016.01)
*B25B 21/02* (2006.01)

(52) U.S. Cl.
CPC .............. *H02K 11/33* (2016.01); *H02K 7/145* (2013.01); *H02P 6/085* (2013.01); *B25B 21/02* (2013.01)

(58) Field of Classification Search
CPC ............ H02K 7/00; H02K 7/14; H02K 7/145; H02K 11/00; H02K 11/33; H02P 6/00; H02P 6/08; H02P 6/085; H02P 6/16; H02P 6/18; H02P 6/183; H02P 29/00; H02P 29/02; H02P 29/024; B25B 21/00; B25B 21/02; B25B 21/026; B25F 5/00; B25F 5/02
See application file for complete search history.

(56) References Cited

U.S. PATENT DOCUMENTS

| | | | | |
|---|---|---|---|---|
| 2017/0234484 A1* | 8/2017 | Vanko | ................... | B24B 23/028 173/176 |
| 2018/0367070 A1* | 12/2018 | Ichikawa | .................. | H02P 3/12 |

FOREIGN PATENT DOCUMENTS

| | | | |
|---|---|---|---|
| CN | 104767429 A | | 7/2015 |
| JP | 2015009316 A | * | 1/2015 |
| JP | 2015211591 A | * | 11/2015 |
| WO | 2018214979 A1 | | 11/2018 |

* cited by examiner

*Primary Examiner* — Tran N Nguyen
(74) *Attorney, Agent, or Firm* — Greenberg Traurig, LLP

(57) ABSTRACT

A controller of a power tool outputs a driving signal to a motor driving circuit and acquires a position of a rotor of a brushless motor. While acquiring the position of the rotor of the brushless motor, a phase voltage or a line voltage of a winding of the brushless motor is detected through the voltage detection circuit. Whether an upper bridge arm switching element, a lower bridge arm switching element, and/or the brushless motor is short-circuited is determined according to the phase voltage or the line voltage of the winding of the brushless motor.

10 Claims, 5 Drawing Sheets

POWER-ON SELF-TEST METHOD FOR AN ELECTRIC POWER TOOL AND AN ELECTRIC POWER TOOL

RELATED APPLICATION INFORMATION

This application claims the benefit of CN 202010062856.7, filed on Jan. 19, 2020, the disclosure of which is incorporated herein by reference in its entirety.

TECHNICAL FIELD

The present disclosure relates to the technical field of electronics, and in particular, a power-on self-test method for an electric power tool and an electric power tool.

BACKGROUND

A brushless direct current motor adopts semiconductor switching elements to implement electronic commutation, that is, an electronic switching element is used to replace a traditional contact commutator and a brush. The electronic switching element has advantages of high reliability, no commutation spark, low mechanical noise and so on, and is widely used in various electric power tools.

Since the electronic switching element is closely related to a voltage and a current, overvoltage or overcurrent both damage the electronic switching element. Therefore, after the electric power tool is turned on, typically, whether a problem of short circuit exists in the switching element is detected, so as to prevent damage to other elements in the electric power tool. Generally, a voltage between the switching elements is detected before starting up, so as to determine whether there is a short circuit in the switching elements. However, this detection method cannot guarantee the safety of electric power tool. When the switching element is short-circuited, a risk of burning the machine will be exposed when starting up, and boot time is relatively long, thus reducing an experience effect of a user.

SUMMARY

Examples of the present disclosure provide a power-on self-test method for an electric power tool and an electric power tool, so as to achieve detection of whether a switching element is short-circuited when the electric power tool is started, thereby saving boot time.

An example of the present disclosure provides a power-on, self-test method for an electric power tool. The electric power tool includes a brushless motor, a motor driving circuit, a controller, and a voltage detection circuit. The motor driving circuit includes an inverter bridge, the inverter bridge includes an upper bridge arm switching element and a lower bridge arm switching element. A phase voltage input terminal or a line voltage input terminal of the brushless motor is connected to the inverter bridge. A line connected between the phase voltage input terminal or the line voltage input terminal of the brushless motor and the inverter bridge is connected to the voltage detection circuit, and the voltage detection circuit is connected to the controller.

In the example, power-on, self-test method for the electric power tool the steps described below are included.

In response to monitoring a power-on signal from the electric power tool, the controller outputs a driving signal to the motor driving circuit and acquires a position of a rotor of the brushless motor.

During acquiring the position of the rotor of the brushless motor, a phase voltage or a line voltage of a winding of the brushless motor is detected through the voltage detection circuit.

Whether the upper bridge arm switching element, the lower bridge arm switching element, and/or the brushless motor is short-circuited is determined according to the phase voltage or the line voltage of the winding of the brushless motor.

An example of the present disclosure further provides an electric power tool that includes a functional element, a brushless motor, a power-on signal monitoring circuit, a motor driving circuit, a voltage detection circuit, and a controller.

The functional element is configured to realize a function of the electric power tool.

The brushless motor is configured to drive the functional element, and the brushless motor includes a stator and a rotor.

The power-on signal monitoring circuit is configured to monitor whether the electric power tool is started and output a power-on signal in response to monitoring that the electric power tool is started.

The motor driving circuit is configured to drive the brushless motor to rotate according to a driving signal.

The voltage detection circuit is configured to detect a phase voltage or a line voltage of a winding of the brushless motor.

The controller is configured to acquire a position of the rotor of the brushless motor, to receive the power-on signal and output the driving signal to the motor driving circuit, and to determine, according to the phase voltage or the line voltage of the winding of the brushless motor, whether an upper bridge arm switching element of the motor driving circuit, a lower bridge arm switching element of the motor driving circuit, and/or the brushless motor is short-circuited.

In the solution provided by the examples of the present disclosure, in response to monitoring the power-on signal of the electric power tool, the controller transmits the driving signal to the motor driving circuit so as to detect the position of the rotor of the brushless motor when the rotor is motionless. During detecting the position of the rotor of the brushless motor, whether the switching elements and/or the brushless motor is short-circuited is determined according to the phase voltages or the line voltages of the windings of the brushless motor. If the switching elements and/or the brushless motor is detected to be short-circuited, the brushless motor is prevented from starting again, thus reducing the risk of burning the machine; otherwise, the brushless motor is started. Since the detection of whether the switching elements have the problem of short circuit is performed during detecting the position of the rotor of the brushless motor, the boot time of the electric power tool can be saved when the electric power tool is started.

DETAILED DESCRIPTION

Figure 1:
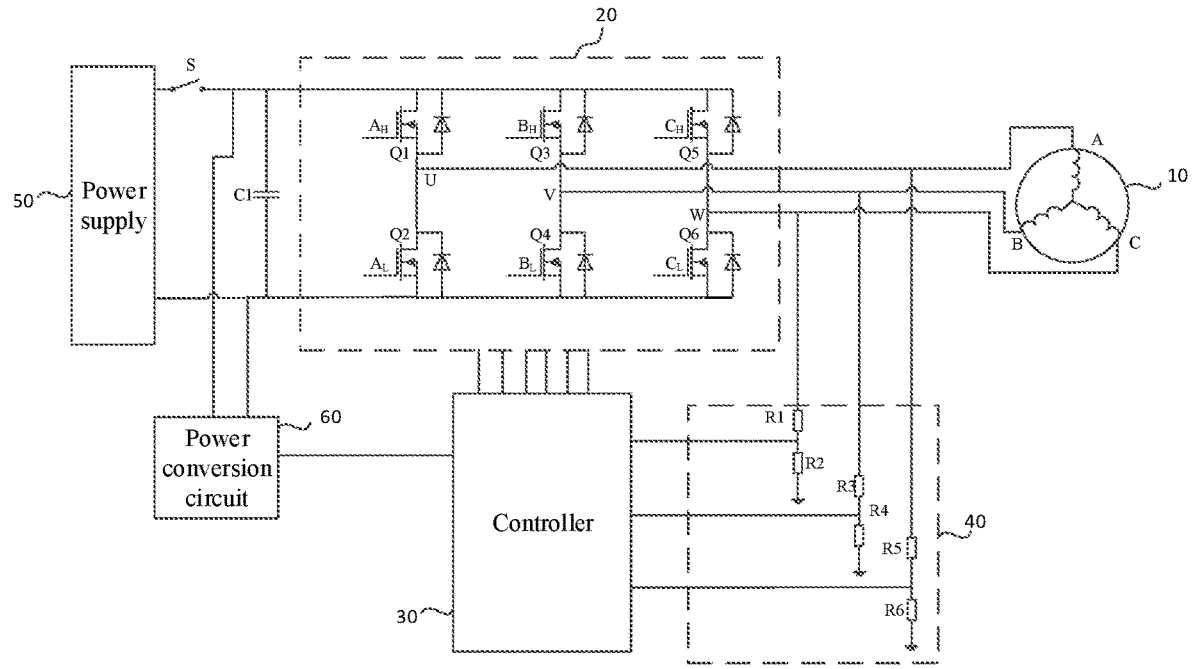
FIG. 1 is a circuit structure diagram of an electric power tool according to an example of the present disclosure.

Hereinafter the present disclosure is further described in detail in conjunction with the drawings and examples. It is to be understood that the examples set forth below are merely intended to illustrate and not to limit the present disclosure. Additionally, it is to be noted that for ease of description, only part, not all, of the structures related to the present disclosure are illustrated in the drawings.

Figure 2:
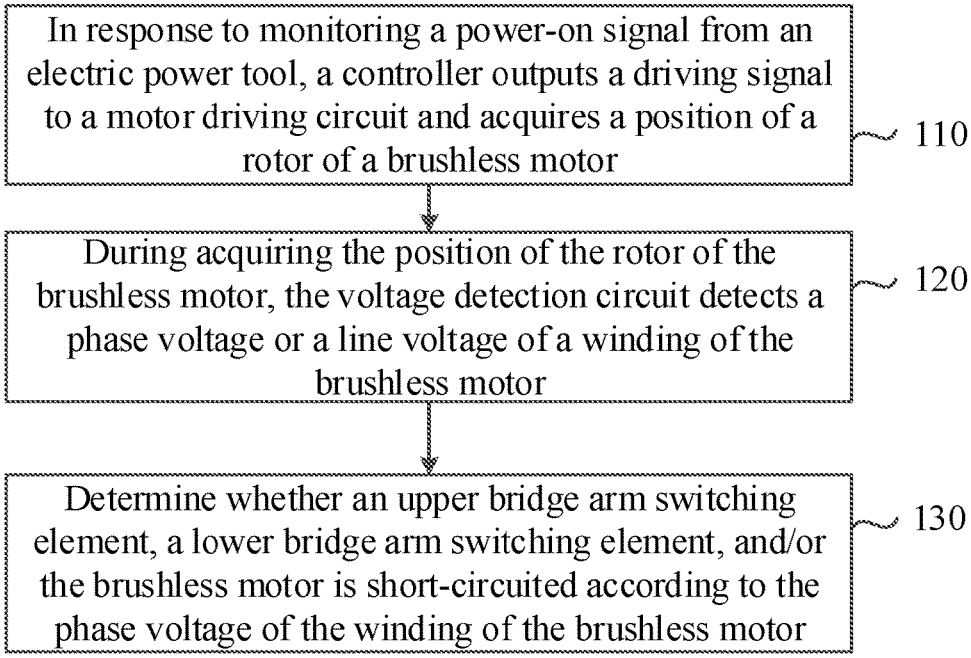
FIG. 2 is a flowchart of a power-on self-test method for an electric power tool according to an example of the present disclosure.

FIG. 1 is a circuit structure diagram of an electric power tool according to an example of the present disclosure. FIG. 2 is a flowchart of a power-on self-test method for an electric power tool according to an example of the present disclosure. Referring to FIG. 1 and FIG. 2, this method may be executed by the electric power tool, and in particular, may be executed by software and/or hardware in the electric power tool. The electric power tool includes a brushless motor 10, a motor driving circuit 20, a controller 30, and a voltage detection circuit 40. The motor driving circuit 20 includes an inverter bridge, and the inverter bridge includes an upper bridge arm switching element and a lower bridge arm switching element. A voltage input terminal of the brushless motor 10 is connected to the inverter bridge. A line connected between the voltage input terminal of the brushless motor 10 and the inverter bridge is connected to the voltage detection circuit 40, and the voltage detection circuit 40 is connected to the controller 30.

The power-on self-test method for the electric power tool includes steps described below.

In step 110, in response to monitoring a power-on signal from the electric power tool, the controller outputs a driving signal to the motor driving circuit and acquires a position of a rotor of the brushless motor.

The power-on signal may be a signal that activates the brushless motor 10 after a switch S is triggered. A power supply 50 may include an alternating current power supply, and the alternating current power supply is used in combination with a rectifier filter module, an electromagnetic compatibility module, and the like; or the power supply device 50 may include a direct current power supply, such as a battery pack, where the battery pack is detachably mounted in the electric power tool. In an example, the upper bridge arm switching element of the inverter bridge includes Q1, Q3, and Q5, and the lower bridge arm switching element includes Q2, Q4 and Q6. In response to the power-on signal from the electric power tool being detected by the controller 30, the controller 30 transmits a drive pulse signal to the switching elements Q1 to Q6, so as to enable conducting states of windings of the brushless motor 10 respectively to be that the phase AB is conductive, the phase AC is conductive, the phase BC is conductive, the phase BA is conductive, the phase CA is conductive, and the phase CB is conductive. The position of the rotor of the brushless motor 10 when the rotor is motionless is determined by a pulse injection method, which can effectively avoid instantaneous reversal or start failure of the brushless motor 10.

In step 120, during acquiring the position of the rotor of the brushless motor, a phase voltage or a line voltage of a winding of the brushless motor is detected through the voltage detection circuit.

In an example, the upper bridge arm switching elements and the lower bridge arm switching elements of the inverter bridge constitute a three-phase bridge and are respectively connected to three phase windings A, B and C of the brushless motor 10. Exemplarily, the upper bridge arm switching element Q1 and the lower bridge arm switching element Q2 constitute a bridge of a phase-A winding, and a voltage input terminal of the phase-A winding is connected to a point U between the switching element Q1 and the switching element Q2. The upper bridge arm switching element Q3 and the lower bridge arm switching element Q4 constitute a bridge of a phase-B winding, and a voltage input terminal of the phase-B winding is connected to a point V between the switching element Q3 and the switching element Q4. The upper bridge arm switching element Q5 and the lower bridge arm switching element Q6 constitute a bridge of a phase-C winding, and a voltage input terminal of the phase-C winding is connected to a point W between the switching element Q5 and the switching element Q6.

When the controller 30 transmits the drive pulse signal to the motor driving circuit 20, the switching elements Q1 to Q6 change the conducting state thereof according to a driving signal transmitted by the controller 30, thereby changing states of voltages applied by the power supply 50 on the windings of the brushless motor 10. During acquiring the position of the rotor of the brushless motor 10, voltages (that is, phase voltages or line voltages of the three phase windings of the brushless motor 10, where the line voltage is $\sqrt{3}$ times the phase voltage) at the three points U, V, and W are detected through the voltage detection circuit 40 connected between the brushless motor 10 and the motor driving circuit 20. Exemplarily, the voltage detection circuit 40 may include three voltage collection branches, and each of the three voltage collection branches corresponds to one phase winding. Resistors R1 to R6 are collection resistors, which are configured to collect the phase voltages or the line voltages of the windings of the brushless motor 10 and output the collected phase voltages or line voltages of the windings to the controller 30.

In step 130, whether the upper bridge arm switching element, the lower bridge arm switching element, and/or the brushless motor is short-circuited is determined according to the phase voltage or the line voltage of the winding of the brushless motor.

In an example, in response to the power-on signal being monitored by the controller 30, the controller 30 controls on-off states of the switching elements in the motor driving circuit 20, so as to determine the position of the rotor of the brushless motor 10 when the rotor is motionless. During the controller 30 acquiring the position of the rotor of the brushless motor 10, the voltage detection circuit 40 collects the phase voltages or the line voltages of the three phase windings of the brushless motor 10, and the controller 30 determines, according to the received phase voltages or line voltages of the windings, whether the upper bridge arm switching elements in the motor driving circuit 20, the lower bridge arm switching elements in the motor driving circuit 20, and/or the brushless motor 10 is short-circuited. If it is determined that the upper bridge arm switching elements, the lower bridge arm switching elements, and/or the brushless motor 10 is short-circuited, the brushless motor 10 is prevented from starting. For example, the activation of the brushless motor 10 may be stopped by blocking the driving signal output by the controller 30. If it is determined that the upper bridge arm switching elements, the lower bridge arm switching elements, and/or the brushless motor 10 is not short-circuited, the brushless motor 10 is started after the position of the rotor of the brushless motor 10 is determined. Of course, the solution provided by the example of the present disclosure may also be used to detect whether the brushless motor 10 has a problem of interphase short circuit.

In the solution provided by the examples of the present disclosure, in response to monitoring the power-on signal from the electric power tool, the controller transmits the driving signal to the motor driving circuit so as to detect the position of the rotor of the brushless motor when the rotor is motionless. And during detecting the position of the rotor of the brushless motor, whether the switching elements or the brushless motor are short-circuited is determined according to the phase voltages or the line voltages of the windings of the brushless motor. If the switching elements or the brushless motor are detected to be short-circuited, the brushless motor is prevented from starting again, thus reducing the risk of burning the machine; otherwise, the brushless motor is started. Since the detection of whether the switching elements have the problem of short circuit is performed during detecting the position of the rotor of the brushless motor, the boot time of the electric power tool can be saved when the electric power tool is started.

Figure 3:
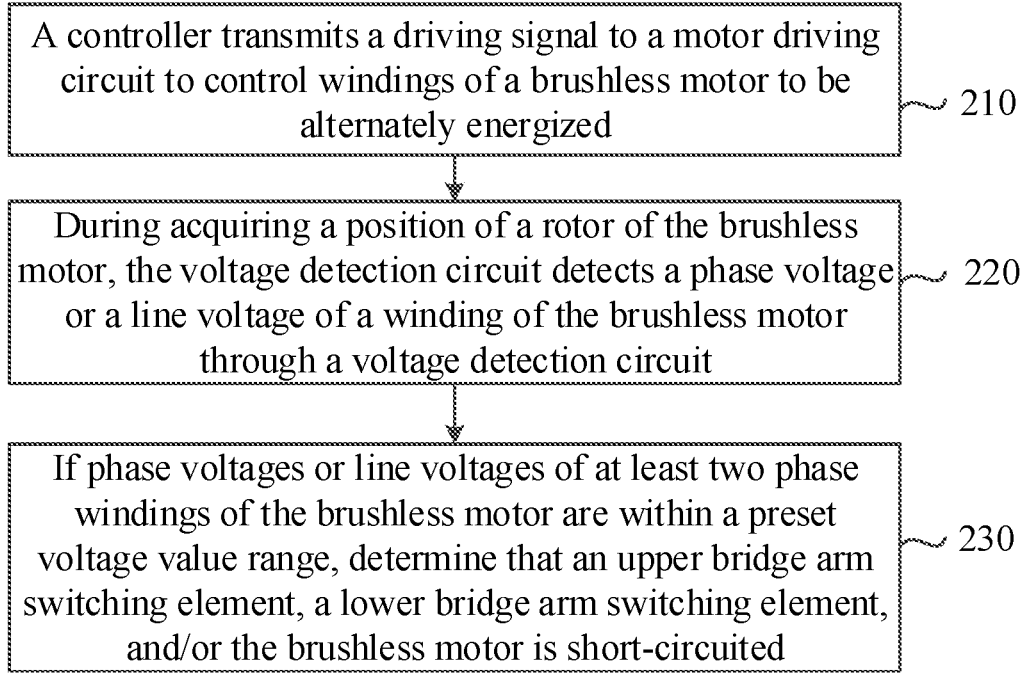
FIG. 3 is a flowchart of another power-on self-test method for an electric power tool according to an example of the present disclosure.

FIG. 3 is a flowchart of another power-on self-test method for the electric power tool according to an example of the present disclosure. Referring to FIG. 3, on the basis of the above-mentioned examples, the power-on self-test method for the electric power tool provided by the example of the present disclosure includes steps described below.

In step 210, the controller transmits a driving signal to the motor driving circuit to control the windings of the brushless motor to be alternately energized.

In an example, in response to a power-on signal from the electric power tool being detected by the controller 30, the controller 30 transmits a drive pulse signal to switching elements Q1 to Q6, so as to enable conducting states of windings of the brushless motor 10 respectively to be that the phase AB is conductive, the phase AC is conductive, the phase BC is conductive, the phase BA is conductive, the phase CA is conductive, and the phase CB is conductive. The position of the rotor of the brushless motor 10 when the rotor is motionless is determined by a pulse injection method. Exemplarily, the switching elements in the motor driving circuit 20 may be metal-oxide-semiconductor field effect transistors (MOSFETs) or insulated gate bipolar translators (IGBTs). For the MOSFET, a gate terminal of each switching element is electrically connected to a signal output terminal of the controller 30, and a drain or a source of each switching element is electrically connected to a phase voltage input terminal or a line voltage input terminal of the winding of the brushless motor 10. For example, a source of the switching element Q1 and a drain of the switching element Q2 are electrically connected to a voltage input terminal of the phase-A winding of the brushless motor 10. The switching elements Q1 to Q6 change on-off states of the switching elements according to the driving signal output by the controller 30, thus changing states of voltages applied by the power supply 50 on the windings of the brushless motor 10, so as to determine the position of the rotor of the brushless motor 10 when the rotor is motionless.

In step 220, during acquiring the position of the rotor of the brushless motor, a phase voltage or a line voltage of a winding of the brushless motor is detected through the voltage detection circuit.

In step 230, if phase voltages or line voltages of at least two windings of the brushless motor are within a preset voltage value range, it is determined that the upper bridge arm switching element, the lower bridge arm switching element, and/or the brushless motor is short-circuited.

In an example, in response to the power-on signal being monitored by the controller 30, the controller 30 controls the on-off states of the switching elements in the motor driving circuit 20, so as to determine the position of the rotor of the brushless motor 10 when the rotor is motionless. During the controller 30 acquiring the position of the rotor of the brushless motor 10, the phase voltages or the line voltages of the three phase windings of the brushless motor 10 are collected by the voltage detection circuit 40. The controller 30 detects the phase voltages or the line voltages collected by the voltage detection circuit 40, and if the phase voltages or the line voltages of at least two phase windings of the three phase windings are within the preset voltage value range, it can be determined that the upper bridge arm switching elements in the motor driving circuit 20, the lower bridge arm switching elements in the motor driving circuit 20, and/or the brushless motor 10 is short-circuited. The preset voltage value range may be understood that the phase voltages or the line voltages of the at least two phase windings have similar voltage values. For example, whether voltage values at three points U, V, and W have similar values is determined and collected by comparing voltage values of the collection resistors, or whether at least two of the voltage values at the three points U, V and W have similar values is determined by detecting pulse voltage waveforms at the three points U, V and W. Exemplarily, the controller 30 outputs the driving signal to control the upper bridge arm switching element Q1 to be conductive and the lower bridge arm switching element Q4 to be conductive, the source of the switching element Q1 is connected to the phase-A winding of the brushless motor 10, and the drain of the switching element Q4 is connected to the phase-B winding of the brushless motor 10, that is, the phase-A winding and the phase-B winding of the brushless motor 10 are energized and the phase-C winding of the brushless motor 10 is deenergized. Therefore, a phase voltage or a line voltage of the phase-A winding is maximum, a phase voltage or a line voltage of phase-B winding is minimum, and a phase voltage or a line voltage of the phase-C winding is a neutral point voltage, which is between values of the phase voltage or the line voltage of the phase-A winding and the phase voltage or the line voltage of the phase-B winding. Since two switching elements of a same group of bridge cannot be conductive at the same time, if the lower bridge arm switching element Q2 is short-circuited, a voltage at the point V rises to a voltage at the point W, that is, the phase voltage or the line voltage of the phase-C winding is equal to or similar to the phase voltage or the line voltage of the phase-B winding (that is, voltage values at the points V and W are similar), and thus it can be determined that the lower bridge arm switching element Q2 is short-circuited. When the drive pulse signal output by the controller 30 enables the switching elements Q3 and Q6 to be conductive, the phase-B winding and the phase-C winding of the brushless motor 10 are energized and the phase-A winding is deenergized. Therefore, a phase voltage or a line voltage of the phase-B winding is maximum, a phase voltage or a line voltage of phase-C winding is minimum, and a phase voltage or a line voltage of the phase-A winding is a neutral point voltage, which is between the phase voltage or the line voltage of the phase-B winding and the phase voltage or the line voltage of the phase-C winding. If the lower bridge arm switching element Q4 is short-circuited, a bridge connected to the phase-B winding of the brushless motor 10 is conductive, such that a voltage at the point W rises to a voltage at the point U, that is, the voltages at the points U and W are similar, so it can be determined that the lower bridge arm switching element Q4 is short-circuited. In the same way, whether the upper bridge arm switching elements and the brushless motor 10 are short-circuited is determined, and the specific method will not be repeated herein.

Figure 4:
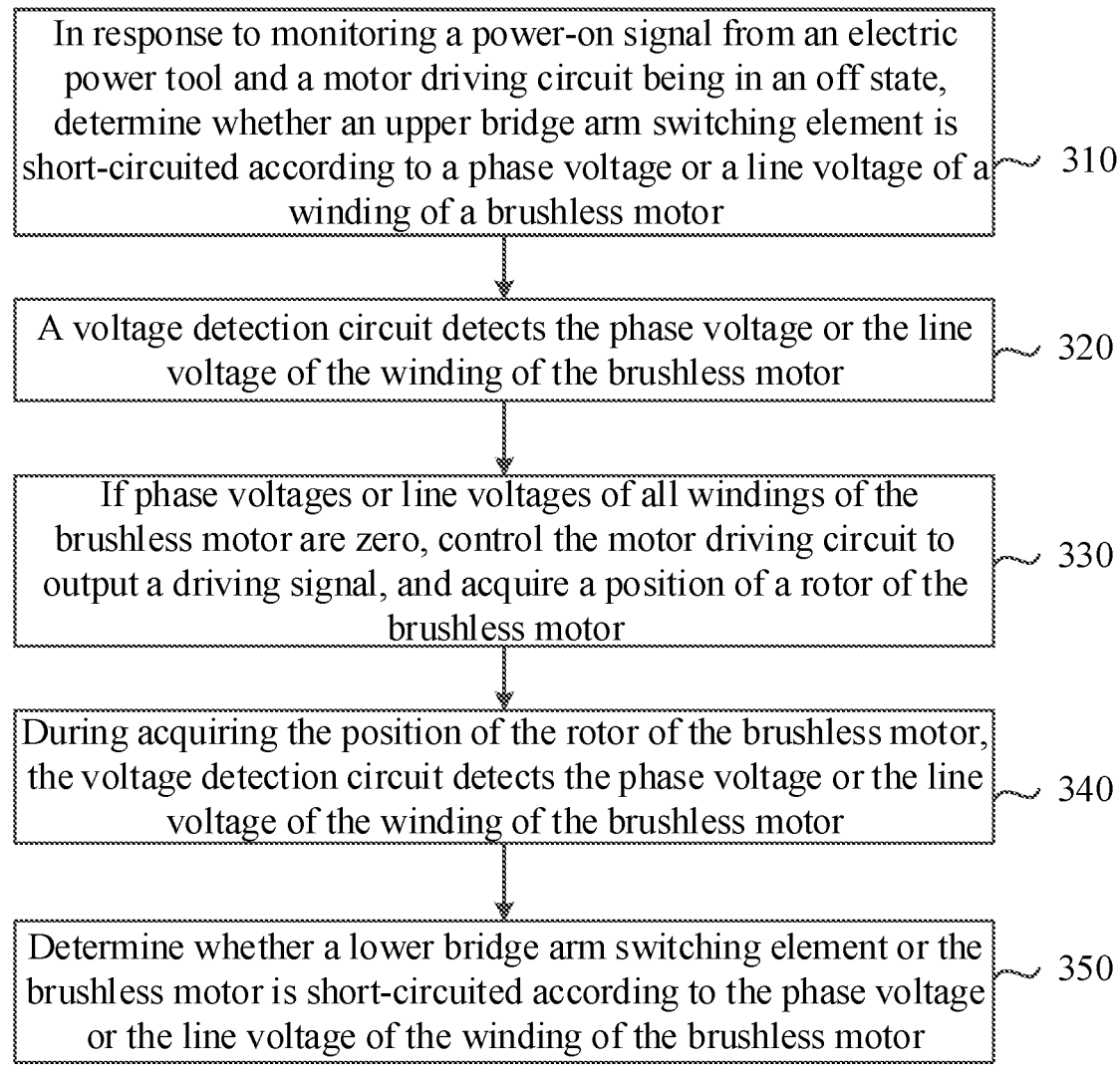
FIG. 4 is a flowchart of still another power-on self-test method for an electric power tool according to an example of the present disclosure.

FIG. 4 is a flowchart of another power-on self-test method for the electric power tool according to an example of the present disclosure. On the basis of the above-mentioned examples, referring to FIG. 4, the power-on self-test method for the electric power tool provided by the example of the present disclosure includes steps described below.

In step 310, in response to monitoring a power-on signal from the electric power tool and the motor driving circuit being in an off state, whether an upper bridge arm switching element is short-circuited is determined according to the phase voltage or the line voltage of the winding of the brushless motor.

In an example, when the controller 30 monitors the power-on signal from the electric power tool, the controller 30 does not output a driving signal to the motor driving circuit 20, and the upper bridge arm switching elements and the lower bridge arm switching elements in the motor driving circuit 20 are all in the off state. At this time, the phase voltages or the line voltages of the three phase windings of the brushless motor 10, that is, voltages at the points U, V and W, are detected by the voltage detection circuit 40. When the controller 30 monitors the power-on signal, the controller 30 does not firstly output the driving signal to the switching elements Q1-Q6, the voltage detection circuit 40 directly collects the phase voltages or the line voltages of the three phase windings of the brushless motor 10, and the controller 30 determines, according to the received phase voltages or line voltages of the three phase windings, whether the upper bridge arm switching elements in the motor driving circuit 20 are short-circuited. If it is determined that the upper bridge arm switching element is short-circuited, the brushless motor 10 is prevented from starting. If it is determined that the upper bridge arm switching elements are not short-circuited, the controller 30 outputs the driving signal to the motor driving circuit 20, and the position of the rotor of the brushless motor 10 when the rotor is motionless is determined by controlling the on-off states of the switching elements in the motor driving circuit 20. During the controller 30 acquiring the position of the rotor of the brushless motor 10, the voltage detection circuit 40 collects the phase voltages or the line voltages of the three phase windings of the brushless motor 10, and the controller 30 determines, according to the received phase voltages or line voltages of the three phase windings, whether the lower bridge arm switching elements in the motor driving circuit 20 are short-circuited.

In step 320, the phase voltage or the line voltage of the winding of the brushless motor is detected through the voltage detection circuit.

In an example, when the controller 30 monitors the power-on signal from the electric power tool, the controller 30 does not output the driving signal to the motor driving circuit 20, and the upper bridge arm switching elements and the lower bridge arm switching elements in the motor driving circuit 20 are all in the off state. At this time, the phase voltages or the line voltages of the three phase windings of the brushless motor 10, that is, the voltages at the points U, V and W are detected by the voltage detection circuit 40.

In step 330, if the phase voltages or the line voltages of all windings of the brushless motor 10 are zero, the motor driving circuit is controlled to output the driving signal, and the position of the rotor of the brushless motor is acquired.

In an example, when the controller 30 monitors the power-on signal, the controller 30 does not firstly output the driving signal to the switching elements Q1 to Q6 such that the switching elements Q1 to Q6 are in the off state, the voltage detection circuit 40 directly collects the phase voltages or the line voltages of the three phase windings of the brushless motor 10, and if it is detected that all the phase voltages or the line voltages of the three phase windings of the brushless motor 10 are zero, the upper bridge arm switching elements in the motor driving circuit 20 are normal. The controller 30 outputs the driving signal to the motor driving circuit 20 such that the switching elements Q1 to Q6 are alternatively conductive, so as to enable conducting states of the three phase windings of the brushless motor 10 respectively to be that the phase AB is conductive, the phase AC is conductive, the phase BC is conductive, the phase BA is conductive, the phase CA is conductive, and the phase CB is conductive. The controller 30 determines, according to the conducting states of the three phase windings, to determine the position of the rotor of the brushless motor 10 when the rotor is motionless, which can effectively avoid instantaneous reversal or start failure of the brushless motor 10.

In step 340, during acquiring the position of the rotor of the brushless motor, the phase voltage or the line voltage of the winding of the brushless motor is detected through the voltage detection circuit.

In step 350, whether the lower bridge arm switching element or the brushless motor is short-circuited is determined according to the phase voltage or the line voltage of the winding of the brushless motor.

Figure 5:
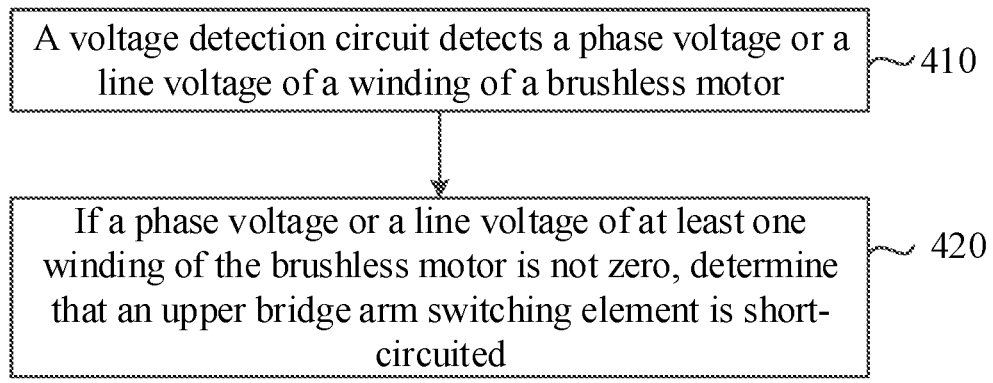
FIG. 5 is a flowchart of still another power-on self-test method for an electric power tool according to an example of the present disclosure.

FIG. 5 is a flowchart of another power-on self-test method for the electric power tool according to an example of the present disclosure. On the basis of the above-mentioned examples, referring to FIG. 5, the power-on self-test method for the electric power tool provided by the example of the present disclosure includes steps described below.

In step 410, a phase voltage or a line voltage of a winding of the brushless motor is detected through the voltage detection circuit.

In step 420, if a phase voltage or a line voltage of at least one winding of the brushless motor is not zero, it is determined that the upper bridge arm switching element is short-circuited.

In an example, when the upper bridge arm switching elements and the lower bridge arm switching elements in the motor driving circuit 20 are all normal, the controller 30 does not output the driving signal to the switching elements Q1 to Q6. Therefore, the motor driving circuit 20 does not work, and the voltages at the points U, V, and W are all zero. If a phase voltage or a line voltage of at least one winding of the three phase windings of the brushless motor 10 is not zero, it can be determined that at least one switching element of the upper bridge arm switching elements in the motor driving circuit 20 is short-circuited. Exemplarily, when the motor driving circuit 20 is in the off state, the phase voltages or the line voltages of the three phase windings of the brushless motor 10 are detected by the voltage detection circuit 40, if both the phase voltage or the line voltage of the phase-A winding and the phase voltage or the line voltage of the phase-B winding are zero, and the phase voltage or the line voltage of the phase-C winding is not zero, it can be determined that the upper bridge arm switching element Q5 electrically connected to the phase-C winding is short-circuited. In the example of the present disclosure, when the electric power tool is started, firstly, the phase voltages or the line voltages of the three phase windings of the brushless motor 10 are detected by the voltage detection circuit 40 in a case where all switching elements of the motor driving circuit 20 are turned off, so as to determine whether the upper bridge arm switching elements have a short circuit. If a phase voltage or a line voltage of a certain phase winding is not zero, the upper bridge arm switching element electrically connected to the certain phase winding has a short circuit. When it is determined that the upper bridge arm switching element has the short circuit, the controller does not output the driving signal to the motor driving circuit 20, thereby preventing the brushless motor 10 from rotating.

Figure 6:
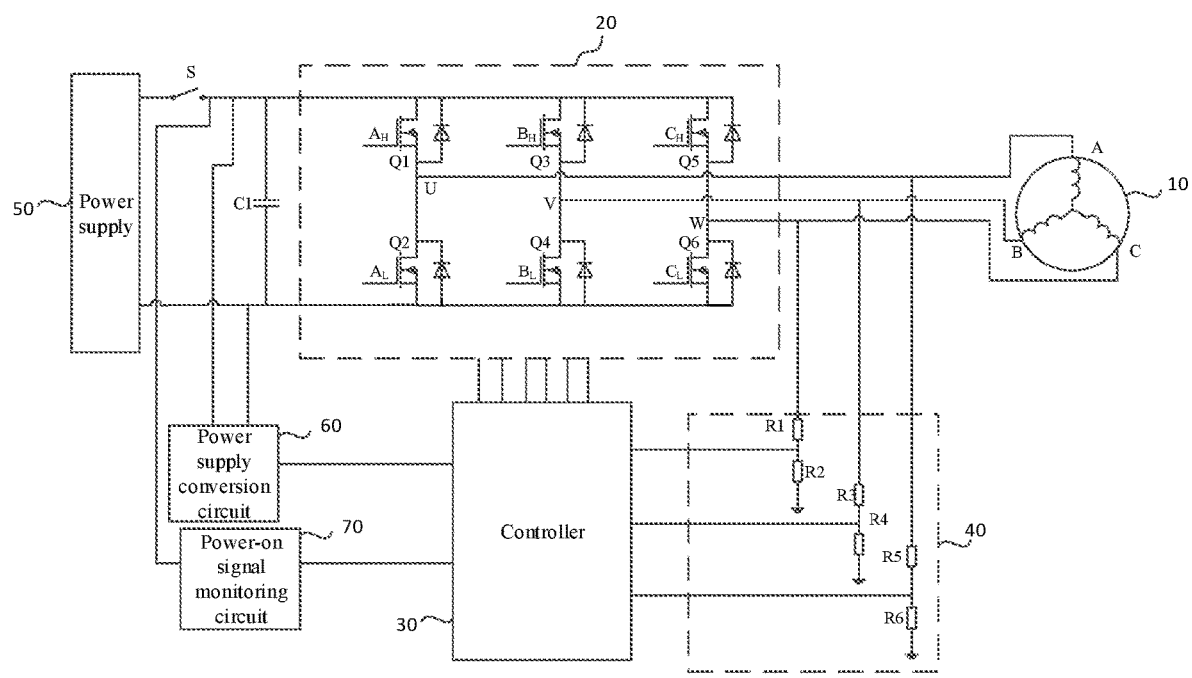
FIG. 6 is a circuit structure diagram of another electric power tool according to an example of the present disclosure.
Figure 7:
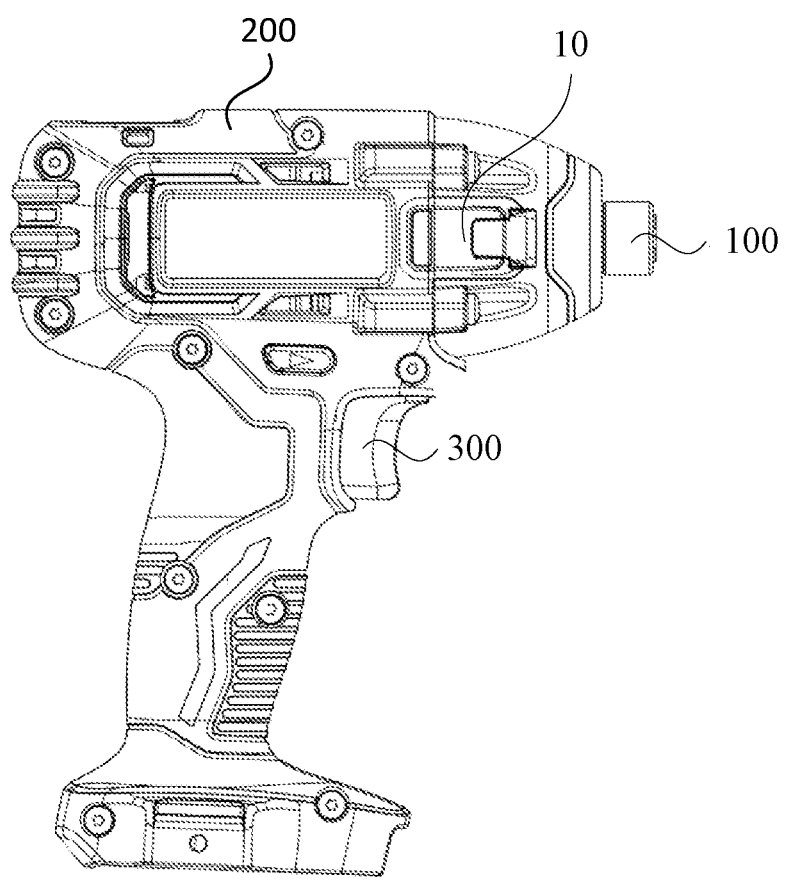
FIG. 7 is a structure diagram of an electric power tool according to an example of the present disclosure.

In an example, FIG. 6 is a circuit structure diagram of another electric power tool according to an example of the present disclosure. FIG. 7 is a structure diagram of an electric power tool according to an example of the present disclosure. The electric power tool may be a hand-held electric power tool, a garden electric power tool, or a vehicle electric power tool. The electric power tool includes, but is not limited to, an electric power tool requiring speed regulation such as a screwdriver, an electric drill, a wrench, or an angle grinder; an electric power tool used for polishing workpieces, such as a sander; an electric power tool used for cutting workpieces, such as a reciprocating saw, a circular saw, or a scroll saw; and an electric power tool used for impacting such as an electric hammer. These electric power tools may also be garden tools, such as a pruning machine or a chain saw. In addition, these electric power tools may also be used for other purposes, such as a mixer. On the basis of the above-mentioned examples, referring to FIG. 6 and FIG. 7, the electric power tool includes a functional element 100, a brushless motor 10, a power-on signal monitoring circuit 70, a motor driving circuit 20, a voltage detection circuit 40, and a controller 30.

The functional element 100 is configured to realize a function of the electric power tool.

The brushless motor 10 is configured to drive the functional element 100, and the brushless motor includes a stator and a rotor.

The power-on signal monitoring circuit 70 is configured to monitor whether the electric power tool is started and output a power-on signal in response to monitoring that the electric power tool is started.

The motor driving circuit 20 is configured to drive the brushless motor 10 to rotate according to a driving signal.

The voltage detection circuit 40 is configured to detect a phase voltage or a line voltage of a winding of the brushless motor 10.

The controller 30 is configured to acquire a position of the rotor of the brushless motor 10, to receive the power-on signal and output the driving signal to the motor driving circuit 20, and to determine whether an upper bridge arm switching element of the motor driving circuit 20, a lower bridge arm switching element of the motor driving circuit 20, and/or the brushless motor is short-circuited according to the phase voltage or the line voltage of the winding of the brushless motor 10.

In the solution provided by the examples of the present disclosure, in response to monitoring the power-on signal of the electric power tool, the controller transmits the driving signal to the motor driving circuit so as to detect the position of the rotor of the brushless motor when the rotor is motionless. During detecting the position of the rotor of the brushless motor, whether the switching element or the brushless motor is short-circuited is determined according to the phase voltage or the line voltage of the winding of the brushless motor. If the switching element or the brushless motor is detected to be short-circuited, the brushless motor is prevented from starting again, thus reducing the risk of burning the machine; otherwise, the brushless motor is started. Since the detection of whether the switching element has the problem of short circuit is performed during detecting the position of the rotor of the brushless motor, the boot time of the electric power tool can be saved when the electric power tool is started.

Optionally, the controller 30 is configured to, during acquiring the position of the rotor of the brushless motor 10, determine that the upper bridge arm switching element, the lower bridge arm switching element, and/or the brushless motor is short-circuited if phase voltages or line voltages of at least two windings of the brushless motor 10 are within a preset voltage value range.

The controller 30 is further configured to, in response to receiving the power-on signal and the motor driving circuit 20 being in an off state, determine that the upper bridge arm switching element is short-circuited if a phase voltage or a line voltage of at least one winding of the brushless motor 10 is not zero.

Optionally, the controller 30 is further configured to transmit a driving signal to the motor driving circuit 20 to control the windings of the brushless motor 10 to be alternately energized.

In an example, in response to the power-on signal from the electric power tool being detected by the controller 30, the controller 30 transmits a drive pulse signal to switching elements Q1 to Q6, so as to enable conducting states of the windings of the brushless motor 10 respectively to be that the phase AB is conductive, the phase AC is conductive, the phase BC is conductive, the phase BA is conductive, the phase CA is conductive, and the phase CB is conductive. The position of the rotor of the brushless motor 10 when the rotor is motionless is determined by a pulse injection method. Exemplarily, the switching elements in the motor driving circuit 20 may be metal-oxide-semiconductor field effect transistors (MOSFETs) or insulated gate bipolar translators (IGBTs). For the MOSFET, a gate terminal of each switching element is electrically connected to a signal output terminal of the controller 30, and a drain or a source of each switching element is electrically connected to a phase voltage input terminal or a line voltage input terminal of the winding of the brushless motor 10. For example, a source of the switching element Q1 and a drain of the switching element Q2 are electrically connected to a phase voltage input terminal or a line voltage input terminal of the phase-A winding of the brushless motor 10. The switching elements Q1 to Q6 change on-off states of the switching elements according to the driving signal output by the controller 30, thus changing states of voltages applied by the power supply 50 on the windings of the brushless motor 10, so as to determine the position of the rotor of the brushless motor 10 when the rotor is motionless.

During the controller 30 acquiring the position of the rotor of the brushless motor 10, the voltage detection circuit 40 collects the phase voltages or the line voltages of the three phase windings of the brushless motor 10, and the controller 30 determines, according to the received phase voltages or line voltages of the three phase windings, whether the lower bridge arm switching elements in the motor driving circuit 20 are short-circuited. If the phase voltages or the line voltages of the at least two phase windings the three phase windings are within the preset voltage value range, it can be determined that the lower bridge arm switching element in the motor driving circuit 20 is short-circuited. The preset voltage value range may be understood that the phase voltages or the line voltages of the at least two phase windings have similar voltage values.

In an example, on the basis of the above-mentioned examples, still referring to FIG. 6, the electric power tool further includes a power supply 50 and a power conversion circuit 60.

The power conversion circuit 60 is electrically connected to the controller 30 and is configured to convert a voltage output by the power supply 50 to a voltage adapted to the controller 30, and the power supply 50 is configured to supply electric energy to the electric power tool.

The electric power tool provided by the example of the present disclosure can execute the power-on self-test method provided by any example of the present disclosure and has corresponding functional modules for executing the method and beneficial effects.

It is to be noted that in the example of the present disclosure, the power-on signal monitoring circuit 70 and the controller 30 are arranged separately, and in other examples, the power-on signal monitoring circuit 70 and the controller 30 may also be integrated as a whole.

On the basis of the above-mentioned examples, still referring to FIG. 6, a specific working principle of the electric power tool provided by the example of the present disclosure is described below.

The power supply 50 is configured to supply electric energy to the electric power tool. The power supply 50 may include an alternating current power supply, and the alternating current power supply is used in combination with a rectifier filter module and an electromagnetic compatibility module and the like to supply direct voltage to the electric power tool. Or the power supply 50 may also include a direct current power supply, such as a battery pack, where the battery pack is detachably mounted in the electric power tool. A power supply 50 is electrically connected to the motor driving circuit through a switch S. When the switch S is closed, the electric power tool is conductive to the power supply, and the power-on signal monitoring circuit 70 outputs the power-on signal to the controller 30. The controller 30 outputs six drive pulse signals to the motor driving circuit 20 to drive each switching element, so as to enable conducting states of the windings of the brushless motor 10 respectively to be that the phase AB is conductive, the phase AC is conductive, the phase BC is conductive, the phase BA is conductive, the phase CA is conductive, and the phase CB is conductive. The position of the rotor of the brushless motor 10 when the rotor is motionless is determined by a pulse injection method.

During the controller 30 acquiring the position of the rotor of the brushless motor 10 when the rotor is motionless, the voltage detection circuit 40 detects the phase voltages or the line voltages of the three phase windings of the brushless motor 10. If the phase voltages or the line voltages of at least two phase windings of the three phase windings of the brushless motor 10 are within the preset voltage value range, the upper bridge arm switching element connected to the another phase winding, the lower bridge arm switching element connected to the another phase winding, and/or the brushless motor is short-circuited. The controller prevents the motor driving circuit 20 from staring, such that the brushless motor cannot rotate.

Of course, whether the upper bridge arm switching elements are short-circuited may be directly detected before acquiring the position of the rotor of the brushless motor 10. When the switch S is closed, the electric power tool is conductive to the power supply, and the power-on signal monitoring circuit 70 outputs the power-on signal to the controller 30. At this time, the controller 30 performs pulse inhibit, no driving signal is output to the switching elements Q1 to Q6 of the motor driving circuit 20, and the voltage detection circuit 40 detects voltages at the points U, V, and W (that is, the phase voltages or the line voltages of the three phase windings of the brushless motor 10) where each phase winding and each bridge are connected to each other. If the phase voltage or the line voltage of at least one phase winding in the phase voltages or line voltages of three phase windings of the brushless motor 10 is not zero, the upper bridge arm switching element connected to the phase winding is short-circuited. The controller prevents the motor driving circuit 20 from staring, such that the brushless motor cannot rotate.

When the voltage detection circuit 40 detects that the phase voltages or the line voltages of the three phase windings are all zero, it indicates that the upper bridge arm switching elements are all normal, the controller 30 outputs six drive pulse signals to the motor driving circuit 20 to drive the respective switching elements, so as to enable conducting states of the three phase windings of the brushless motor 10 respectively to be that the phase AB is conductive, the phase AC is conductive, the phase BC is conductive, the phase BA is conductive, the phase CA is conductive, and the phase CB is conductive. The position of the rotor of the brushless motor 10 when the rotor is motionless is determined by the pulse injection method. During acquiring the position of the rotor of the brushless motor 10, when the voltage detection circuit 40 detects that the phase voltages or the line voltages of the three phase windings are all zero, it indicates that the upper bridge arm switching elements are all normal, and then it is detected whether the lower bridge arm switching elements or the brushless motor 10 is short-circuited. If phase voltages or line voltages of at least two phase windings are similar, it can be determined that there is a short circuit in the lower bridge arm switching elements of the motor driving circuit 20. The controller 30 does not output a driving signal so as to prevent the brushless motor 10 from starting again, thereby reducing the risk of burning the machine. Otherwise, the controller 30 outputs the driving signal to the switching elements Q1 to Q6 of the motor driving circuit 20, such that one upper bridge arm switching element and two lower bridge arm switching elements are alternately conductive or two upper bridge arm switching elements and one lower bridge arm switching element are alternately conductive. The motor driving circuit 20 has a plurality of driving states according to the on-off states of the switching elements, and the stator winding of the brushless motor 10 generates different magnetic fields in different driving states. The controller 30 is configured to output a corresponding driving signal to the motor driving circuit 20 according to a rotational position of the rotor of the brushless motor 10, so as to enable the motor driving circuit 20 to switch to different driving states, thereby changing the voltage states applied to the three phase windings of the brushless motor 10, and thereby the brushless motor 10 generates an alternating magnetic field to drive the rotor to rotate, achieving driving for the brushless motor.

As a specific example, the electric power tool may be a hand-held electric drill. Referring to FIG. 7, the electric power tool includes a housing 200, a brushless motor 10, a functional element 100, and a trigger mechanism 300. The functional element 100 is configured to achieve a function of the electric power tool. For the electric drill, the functional element 100 is a drill bit. The brushless motor 10 is configured to drive the functional element 100 to rotate, and the brushless motor 10 may directly drive the functional element 100 to rotate or may also drive the functional element 100 after the brushless motor is slowed down by a deceleration device. The trigger mechanism 300 is configured for a user to operate and is connected to the switch S in a correlated manner, and the trigger mechanism 300 may be a trigger, a button, or the like. The electric power tool may further include a power supply configured to supply electric energy to the electric power tool. The power supply may be a battery pack, and the battery pack is detachably mounted in the electric power tool.

In the solution provided by the examples of the present disclosure, in response to monitoring that the power-on signal from the electric power tool and all the switching elements of the motor driving circuit are in the off state, whether the upper bridge arm switching element is short-circuited is determined according to the phase voltages or the line voltages of the three phase windings detected by the voltage detection circuit. If the upper bridge arm switching element is short-circuited, the brushless motor is stopped from starting. Otherwise, the controller transmits the driving signal to the motor driving circuit so as to enable every two phase windings of the three phase windings of the brushless motor to be alternately energized, thereby detecting the position of the rotor of the brushless motor when the rotor is motionless. During detecting the position of the rotor of the brushless motor, whether the switching element is short-circuited is determined according to the phase voltages or the line voltages of the three phase windings of the brushless motor detected by the voltage detection circuit. If it is detected that the switching element is short-circuited, the brushless motor is prevented from starting again, thus reducing the risk of burning the machine; otherwise, the brushless motor is started. Of course, in response to monitoring the power-on signal from the electric power tool, the controller may further output the driving signal to the motor driving circuit so as to detect the position of the rotor of the brushless motor when the rotor is motionless. During detecting the position of the rotor of the brushless motor, whether the upper bridge arm switching element, the lower bridge arm switching element, and/or the brushless motor is short-circuited is determined according to the phase voltages or the line voltages of the three phase windings of the brushless motor detected by the voltage detection circuit. The solution provided by the examples of the present disclosure can conveniently and quickly achieve the determination of whether the switching elements are short-circuited through the power-on self-test method, which is beneficial to improving the safety and reliability of the electric power tool. In addition, since the detection of whether the switching elements have the problem of short circuit is performed during detecting the position of the rotor of the brushless motor, the boot time of the electric power tool can be saved when the electric power tool is started.

It is to be noted that the above are merely preferred examples of the present disclosure and the technical principles used therein. It is to be understood by those skilled in the art that the present disclosure is not limited to the specific examples described herein. Those skilled in the art can make various apparent modifications, adaptations and substitutions without departing from the scope of the present disclosure. Therefore, while the present disclosure has been described in detail through the preceding examples, the present disclosure is not limited to the preceding examples and may include more other equivalent examples without departing from the concept of the present disclosure. The scope of the present disclosure is determined by the scope of the appended claims.

What is claimed is:

1. A power-on, self-test method for an electric power tool comprising a brushless motor having a position detector to detect a position of a rotor, a motor driving circuit, a controller, and a voltage detection circuit wherein the motor driving circuit comprises an inverter bridge, the inverter bridge comprises an upper bridge arm switching element and a lower bridge arm switching element, a phase voltage input terminal of the brushless motor is connected to the inverter bridge, and a line connected between the phase voltage input terminal of the brushless motor and the inverter bridge is connected to the voltage detection circuit, and the voltage detection circuit is connected to the controller, the power-on, self-test method comprising:
    in response to receiving a power-on signal from a user input element of the electric power tool, outputting, by the controller, a driving signal to the motor driving circuit and receiving a signal indicative of the detected position of the rotor of the brushless motor from the position detector;
    detecting, by the voltage detection circuit, at least one of a phase voltage or a line voltage of a winding of the brushless motor; and
    determining, by the controller comparing at least one of the phase voltage or the line voltage of the winding of the brushless motor to a predetermined voltage, whether at least one of the upper bridge arm switching element, the lower bridge arm switching element, or the brushless motor is short-circuited.

2. The power-on, self-test method for the electric power tool of claim 1, wherein determining, according to the phase voltage or the line voltage of the winding of the brushless motor, whether the upper bridge arm switching element, the lower bridge arm switching element, and/or the brushless motor is short-circuited comprises, in response to phase voltages or line voltages of at least two windings of the brushless motor being within a preset voltage value range, determining that the upper bridge arm switching element, the lower bridge arm switching element, and/or the brushless motor is short-circuited.

3. The power-on, self-test method for the electric power tool of claim 1, wherein outputting, by the controller, the driving signal to the motor driving circuit and acquiring the position of the rotor of the brushless motor comprises outputting, by the controller, the driving signal to the motor driving circuit to control windings of the brushless motor to be alternately energized.

4. The power-on, self-test method for the electric power tool of claim 1, further comprising, in response to monitoring the power-on signal of the electric power tool and the motor driving circuit being in an off state, determining, according to the phase voltage or the line voltage of the winding of the brushless motor, whether the upper bridge arm switching element is short-circuited.

5. The power-on, self-test method for the electric power tool of claim 4, further comprising detecting, by the voltage detection circuit, the phase voltage or the line voltage of the winding of the brushless motor and, in response to a phase voltage or a line voltage of at least one winding of the brushless motor being not zero, determining that the upper bridge arm switching element is short-circuited.

6. The power-on, self-test method for the electric power tool of claim 5, further comprising, in response to phase voltages or line voltages of all windings of the brushless motor being zero, controlling the motor driving circuit to output the driving signal, and acquiring the position of the rotor of the brushless motor.

7. An electric power tool, comprising:
   a functional element configured to realize a function of the electric power tool;
   a brushless motor configured to drive the functional element, wherein the brushless motor comprises a stator and a rotor and is capable of determining a relative positions of the stator and the rotor;
   a power-on signal monitoring circuit configured to monitor whether the electric power tool is started by a user input element and to output a power-on signal in response to monitoring that electric power tool is started;
   a motor driving circuit configured to drive, according to a driving signal, the brushless motor to rotate;
   a voltage detection circuit configured to detect a phase voltage or a line voltage of a winding of the brushless motor; and
   a controller operably coupled to the brushless motor, the power-on signal monitoring circuit, the motor driving circuit, and the voltage detection circuit and containing instructions to acquire the determined relative position of the rotor and the stator of the brushless motor, to receive a power-on signal from the power-on signal monitoring circuit, and to output a driving signal to the motor driving circuit, and to determine by comparison of at least one of the phase voltage or the line voltage of the winding of the brushless motor to a predetermined voltage, whether any of an upper bridge arm switching element of the motor driving circuit, a lower bridge arm switching element of the motor driving circuit, or the brushless motor is short-circuited.

8. The electric power tool of claim 7, wherein the controller is configured to, while acquiring the position of the rotor of the brushless motor, determine that the upper bridge arm switching element, the lower bridge arm switching element, and/or the brushless motor is short-circuited when phase voltages or line voltages of at least two windings of the brushless motor are within a preset voltage value range and, in response to receiving the power-on signal and the motor driving circuit being in an off state, determine that the upper bridge arm switching element is short-circuited when a phase voltage or a line voltage of at least one winding of the brushless motor is not zero.

9. The electric power tool of claim 7, wherein the controller is configured to transmit the driving signal to the motor driving circuit to control windings of the brushless motor to be alternately energized.

10. The electric power tool of claim 7, further comprising a power supply and a power supply conversion circuit wherein the power supply conversion circuit is electrically connected to the controller and is configured to convert a voltage output by the power supply to a voltage adapted to the controller and the power supply is configured to supply electric energy to the electric power tool.

* * * * *